United States Patent
Hoffmann (10) Patent No.: US 7,590,828 B2
(45) Date of Patent: Sep. 15, 2009

(54) PROCESSING A DATA WORD IN A PLURALITY OF PROCESSING CYCLES

(75) Inventor: Marc Hoffmann, Dinslaken (DE)

(73) Assignee: Nokia Corporation, Espoo (FI)

( * ) Notice: Subject to any disclaimer, the term of this patent is extended or adjusted under 35 U.S.C. 154(b) by 245 days.

(21) Appl. No.: 11/660,896

(22) PCT Filed: Sep. 8, 2004

(86) PCT No.: PCT/IB2004/002915
§ 371 (c)(1),
(2), (4) Date: Feb. 21, 2007

(87) PCT Pub. No.: WO2006/027638
PCT Pub. Date: Mar. 16, 2006

(65) Prior Publication Data
US 2007/0255930 A1    Nov. 1, 2007

(51) Int. Cl.
*G06F 17/15* (2006.01)
(52) U.S. Cl. ............................................. 712/221
(58) Field of Classification Search ............... 712/221
See application file for complete search history.

(56) References Cited
U.S. PATENT DOCUMENTS

| | | | | |
|---|---|---|---|---|
| 4,168,529 A | * | 9/1979 | Tomlinson | 708/212 |
| 5,317,283 A | * | 5/1994 | Korhonen | 331/1 A |
| 5,515,300 A | * | 5/1996 | Pierce | 702/190 |
| 6,249,750 B1 | * | 6/2001 | Green et al. | 702/72 |
| 6,256,341 B1 | * | 7/2001 | Ariyoshi et al. | 375/152 |
| 2002/0012387 A1 | * | 1/2002 | Shakeri et al. | 375/150 |
| 2003/0131030 A1 | * | 7/2003 | Sebot et al. | 708/209 |
| 2003/0202567 A1 | * | 10/2003 | Yousef et al. | 375/148 |
| 2004/0098433 A1 | * | 5/2004 | Narayan et al. | 708/410 |

FOREIGN PATENT DOCUMENTS

| | | |
|---|---|---|
| EP | 1067702 | 1/2001 |
| EP | 1441449 | 7/2004 |
| KR | 2004-73536 | 8/2004 |
| WO | WO 01/84734 | 11/2001 |

* cited by examiner

*Primary Examiner*—Eric Coleman
(74) *Attorney, Agent, or Firm*—Alfred A. Fressola; Ware, Fressola, Van Der Sluys & Adolphson LLP (57) ABSTRACT

The invention relates to a processing of a data word in a plurality of processing cycles. In order to improve the efficiency of the processing, the data word is divided for each cycle into a plurality of successive data blocks. The blocks are shifted by one block from one cycle to the next. In each of the cycles, each of the successive blocks is processed in sequence. In the first cycle, the processing results for successive blocks are moreover stored in a memory at memory addresses which change uniformly from one processing result to the next. In each subsequent processing cycle, the processing results for the successive blocks of the subsequent cycle are combined with processing results stored in the memory during a preceding cycle at memory addresses which change uniformly from one processing result in the subsequent cycle to the next.

20 Claims, 5 Drawing Sheets

PROCESSING A DATA WORD IN A PLURALITY OF PROCESSING CYCLES

CROSS REFERENCE TO RELATED APPLICATIONS

This application is for entry into the U.S. national phase under §371 for International Application No. PCT/IB04/002915 having an international filing date of Sep. 8, 2004, and from which priority is claimed under all applicable sections of Title 35 of the United States Code including, but not limited to, Sections 120, 363 and 365(c).

FIELD OF THE INVENTION

The invention relates to a method for processing a data word in a plurality of processing cycles. The invention relates equally to a corresponding processing module, to a corresponding electronic device and to a corresponding system. Finally, the invention relates as well to a corresponding software program product.

BACKGROUND OF THE INVENTION

A data word has to be processed in a variety of applications in a plurality of cycles, for example in a block correlation. A block correlation can be employed for determining the phase shift between a known data word and a received data word, for instance for tracking satellite signals in a satellite based navigation system.

In the Global Positioning System (GPS), for example, code modulated signals are transmitted by several satellites that orbit the earth and received by GPS receivers of which the current position is to be determined. Each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) code known at the receivers. Thus, different channels are obtained for the transmission by the different satellites. The C/A code, which comprises values of −1 and 1 and which is spreading the spectrum over a 1 MHz bandwidth, is repeated every 1023 chips, the epoch of the code being 1 ms. The term chips is used to designate the bits of the C/A code. The carrier frequency of the L1 signal is further modulated with the navigation information at a bit rate of 50 bit/s. The navigation information, which constitutes a data sequence, can be evaluated for example for determining the position of the respective receiver.

A receiver receiving a code modulated signal has to have access to a synchronized replica of the employed modulation code, in order to be able to de-spread the data sequence of the signal. More specifically, a synchronization has to be performed between the received code modulated signal and an available replica code. Usually, an initial synchronization called acquisition is followed by a fine synchronization called tracking. In both synchronization scenarios, correlators are used to find the best match between the replica code sequence and the received signal and thus to find their relative shift called code phase. During the acquisition, the phase of the received signal relative to the available replica code can have any possible value due to uncertainties in the position of the satellite and the time of transmission of the received signal.

As correlators, for instance block correlators can be employed.

Figure 1:
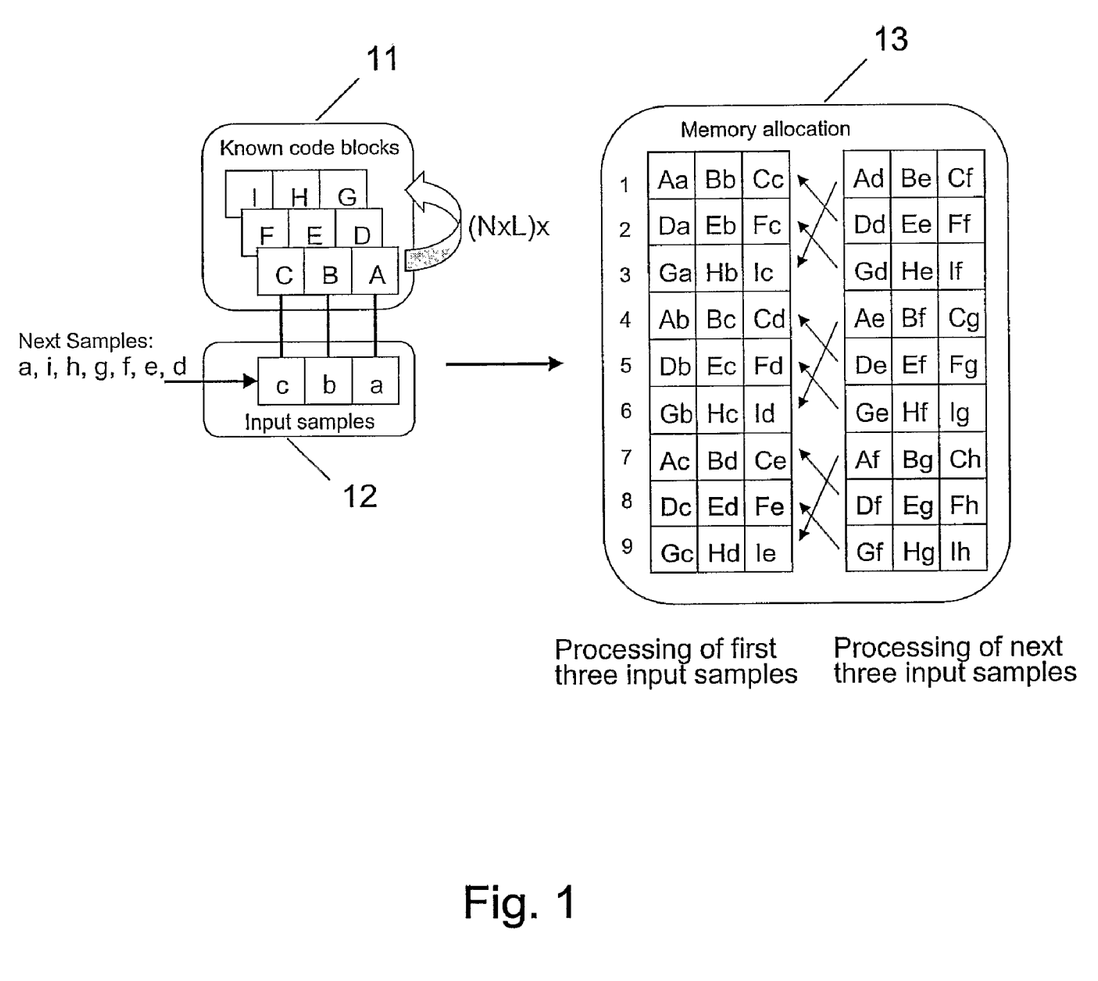
FIG. 1 is a diagram illustrating a conventional memory allocation.

FIG. 1 is a diagram which schematically illustrates the operation of a block correlator.

The correlator has access to a known fixed data word, for instance a C/A code. In the presented example, this data word is represented by the bit sequence 'ABCDEFGHI'. Further, samples are input to the correlator, for instance samples of a received satellite signals. In the presented example, these samples are represented by the bit sequence 'abcdefghiabc . . . '. Now, the correlator is to determine the correlation between the available data word and the input samples for each possible phase shift between the available data word and the received samples.

The block correlator divides to this end the entire available data word continuously into N=3 data blocks, each having a length of L=3 samples, namely block 'ABC', block 'DEF' and block 'GHI'. This is indicated in section 11 of FIG. 1. The first L=3 incoming samples 'abc' are indicated in section 12 of FIG. 1.

The correlator then multiplies the bits of each block with the first L=3 incoming samples 'abc', integrates the respective multiplication results, and stores the respective integration result in a memory at successive memory addresses. For example, the value 'A*a+B*b+C*c' is stored at memory address '1', the value 'D*a+E*b+F*c' is stored at memory address '2' and the value 'G*a+H*b+I*c' is stored at memory address '3'. Each of the stored integration result represents a partial correlation value.

The same procedure is repeated for input samples 'bcd', the integration results being stored at successive memory addresses '4', '5' and '6', respectively. The same procedure is further repeated for input samples 'cde', the integration results being stored at successive memory addresses '7', '8' and '9'.

Now, the first three input samples 'abc' are processed completely, and all N×L employed memory addresses '1' to '9' are filled with partial correlation results for a particular phase shift. This memory allocation is indicated on the left hand side of section 13 of FIG. 1.

The block correlator continues dividing the entire available data word into N=3 data blocks 'ABC', 'DEF' and 'GHI'. The described multiplications and integrations are repeated for each of the next N×L data blocks and the next three input samples 'def'. The integration results, which are indicated on the right hand side of section 13 of FIG. 1, are added at appropriate memory addresses to the already stored partial correlation values, as indicated by arrows in section 13 of FIG. 1.

For example, the value 'A*d+B*e+C*f' is added to the current value stored at memory address '3', the value 'D*d+E*e+F*f' is added to the current value stored at memory address '1' and the value 'G*d+H*e+I*f' is added to the current value stored at memory address '2', etc.

When the input samples 'def', have been processed completely, the block correlator still continues dividing the entire available data word into N=3 data blocks 'ABC', 'DEF' and 'GHI'. The described multiplications and integrations are repeated for each of the next N×L data blocks and the last three input samples 'ghi'. The integration results are added at appropriate memory addresses '1' to '9' to the already stored partial correlation values to obtain final correlation values for each phase shift. This processing part is not shown anymore in FIG. 1.

Thus, the final correlation value stored at memory address '1' is 'A*a+B*b+C*c+D*d+E*e+F*f+G*g+H*h+I*i', the final correlation value stored at memory address '2' is 'D*a+E*b+F*c+G*d+H*e+I*f+A*g+B*h+C*i', the final correlation value stored at memory address '3' is 'G*a+H*b+I*c+A*d+B*e+C*f+D*g+E*h+F*i', etc. On the whole, there are nine different correlation values for nine different phase shifts between the available code and the incoming samples stored at memory addresses '1' to '9'.

As can be seen in FIG. 1, the combination of new partial correlation values with stored partial correlation values requires jumps between memory addresses when accessing the memory. Therefore, the memory address has to be calculated for each combination by a complex state machine.

In particular in case much more than nine samples belong to a data word, the computational effort by means of a state machine is considerable. For GPS receivers, for instance, it is known to use N=31 blocks with L=66 samples each for a single repetition of a C/A code.

SUMMARY OF THE INVENTION

The invention provides a method, a processing module, a device, a system and a software program product which utilize available resources, in particular processing resources, more efficiently.

A method for processing a data word in a plurality of processing cycles is proposed, which comprises dividing the data word for each processing cycle into a plurality of successive data blocks, wherein the successive data blocks are shifted by one data block from one processing cycle to the next. The proposed method further comprises in each of the processing cycles, processing each of the successive data blocks in sequence. The proposed method further comprises in a first processing cycle, storing processing results for the successive data blocks of the first processing cycle in a memory at memory addresses which change uniformly from one processing result to the next. The proposed method further comprises in each subsequent processing cycle, combining the processing results for the successive data blocks of the subsequent processing cycle with processing results stored in the memory during a preceding processing cycle at memory addresses which change uniformly from one processing result in the subsequent processing cycle to the next.

Moreover, a processing module for processing a data word in a plurality of processing cycles is proposed. The processing module comprises a data word dividing component adapted to divide the data word for each processing cycle into a plurality of successive data blocks, wherein the successive data blocks are shifted by one data block from one processing cycle to the next. The proposed processing module further comprises a processing component adapted to process each of the successive data blocks in sequence in each of the processing cycles. The proposed processing module further comprises a combining component adapted to store processing results for successive data blocks of a first processing cycle in a memory at memory addresses which change uniformly from one processing result to the next, and adapted to combine in each subsequent processing cycle the processing results for the successive data blocks of the subsequent processing cycle with processing results stored in the memory during a preceding processing cycle at memory addresses which change uniformly from one processing result in the subsequent processing cycle to the next.

The processing module can be realized in hardware, but equally in software or in a combination of hardware and software.

Moreover, an electronic device is proposed, which comprises such a processing module.

Moreover, a system is proposed, which comprises such a processing module and at least one further module which is adapted to exchange data with the processing module, at least uni-directionally.

Finally, a software program product is proposed, in which a software code for processing a data word in a plurality of processing cycles is stored. The software code realizes the steps of the proposed method when running in a processing component.

The invention is based on the idea that the necessity of jumping between memory addresses can be avoided, if the blocks of a data word are already processed in each processing cycle in a suitable order. It is therefore proposed that the data blocks are re-ordered for a respective processing cycle such that the order of access to the memory addresses corresponds to the actual order of the involved memory addresses. This is achieved more specifically by shifting the data blocks by respectively one data block from one processing cycle to the next.

It is an advantage of the invention that it enables a reduction of the number of required calculations. For each processing cycle, a single calculation is required in order to shift the sequence of data blocks, instead of a dedicated calculation for determining the memory address for each memory access. The invention is of particular advantage for applications in which a large number of data blocks has to be processed.

It is further an advantage of the invention that it can be implemented in a simple and flexible way. For instance, it can be adapted easily to different lengths of data words and different lengths of data blocks.

Typically, all involved memory addresses will be accessed exactly once during a processing cycle. It is to be understood that for each processing cycle, the data word may be represented more than once by the data blocks. The data blocks will usually be selected such that an integer number of data blocks represents the entire data word.

The memory addresses may be changed uniformly, for instance, by incrementing or decrementing the address by a fixed value for each processing result within one processing cycle.

In one embodiment of the invention, the access of the memory is achieved with an address pointer which is incremented for each memory access in a round rotating manner. That is, at the beginning of a new processing cycle, the pointer starts anew from an initial memory address. The pointer can be used for example by a combining component for storing and combining processing results. Such an address pointer can be very simple and small.

Shifting the sequence of data blocks by one block can mean for example shifting the first data block of a preceding processing cycle to the end so that the sequence of data blocks starts off in each processing cycle with the previously second data block.

In one embodiment of the invention, this is realized by generating successive data blocks of the data word cyclically and continuously, except that one data block is skipped at the beginning of a respective subsequent processing cycle.

In one embodiment of the processing module of the invention, the data word dividing component comprises to this end a data word generator, a multiplexer and a counter. The data word generator generates blocks of the data word in a cyclic manner. The counter counts the number of generated blocks and provides a predetermined control signal to the multiplexer whenever a number of blocks required for one processing cycle has been generated. The multiplexer causes the data word generator to generate successive blocks of the data word as long as the counter does not provide the predetermined control signal, and causes the data word generator to skip one block of the data word whenever the counter provides the predetermined control signal.

It is already known from conventional code correlators to provide a counter for generated code blocks in order to enable a tracking of the code phase. Such a counter can be made use of by ensuring that every time the counter is round rotating, the cyclic order of the known code blocks is additionally advanced by one block.

The invention can be employed for any application using a block-oriented algorithm. Block correlation in hardware is only one example of such an application. In a block correlation, a data word is correlated block-wise with provided samples. The data word may be in this case for instance a known code, and the provided samples may be samples of a received code modulated signal.

Correspondingly, the processing of data blocks may comprise any type of block processing which results in intermediate results that have to be stored at different memory addresses or that have to be combined with values already stored at different memory addresses. Depending on the application, combining new processing results with stored processing results may comprise any required type of combining, like adding or multiplying, or simply storing the new processing result in addition to previously stored results.

An electronic device according to the invention can be any device in which a data word has to be processed in a plurality of processing cycles. It can be either mobile or stationary. The electronic device can be for example, though not exclusively, a mobile phone, a Code Division Multiple Access (CDMA) capable receiver or a satellite signal receiver, like a GPS receiver. It may also be a device combining different functions like, for example, a mobile phone comprising a GPS receiver. In this case, the data word processing according to the invention can be implemented for one or more functions of the device.

A system according to the invention can be any of quite different kinds of systems, only a few of which will be presented in the following.

The system may comprise for instance a receiver as a further module, which is adapted to receive signals via the air interface and which provides the received signals to the processing module for an evaluation including the block processing. The processing module might be connectable to the receiver either directly, via cable or via the air interface. If the receiver is a satellite signal receiver and part of a mobile communication device, for example, the processing module may be part of a mobile communication network to which samples of the signals are provided for evaluation.

Alternatively, the system may comprise for instance a network element of a mobile communication network as a further module, while the processing module is a mobile terminal. The network element may then provide assistance data to the mobile terminal for supporting the block based processing.

Further alternatively, the system may be for instance a satellite based navigation system comprising at least one satellite as a further module, and a processing module which comprises in addition the functions of a receiver. The processing module may then receive signals transmitted by these satellites.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 2:
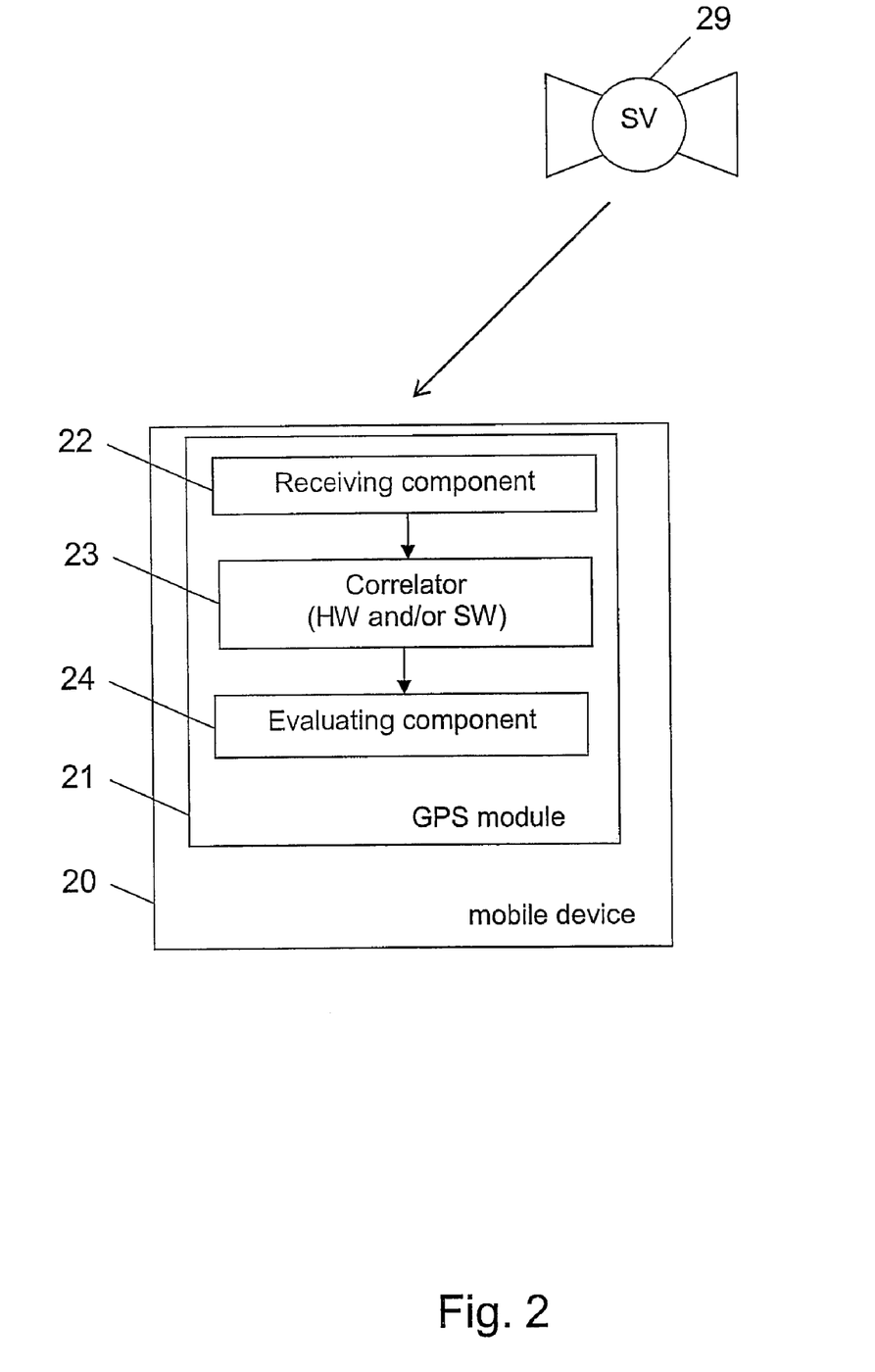
FIG. 2 is a schematic block diagram of a system in which the invention can be implemented.

FIG. 2 is a schematic block diagram of a GPS positioning system, in which a data word processing in accordance with the invention is implemented.

The positioning system comprises a mobile device 20 and a plurality of GPS satellites 29.

The mobile device 20 can be any mobile device which comprises a GPS module 21. The mobile device 20 can be for instance a cellular terminal which includes in addition regular components of a cellular terminal enabling a communication with a cellular network. Alternatively, the mobile device 20 could be for instance a personal digital assistant (PDA). Further alternatively, it could also be a pure GPS device.

The GPS module 21 comprises a receiving component 22, a correlator 23 realized in hardware HW and/or software SW (comprising a computer readable medium for storing the software code), and an evaluating component 24. It is to be understood that the evaluating component 24 could make use of or form part of a processor which is used in addition for other functions of the mobile device 20.

Figure 3:
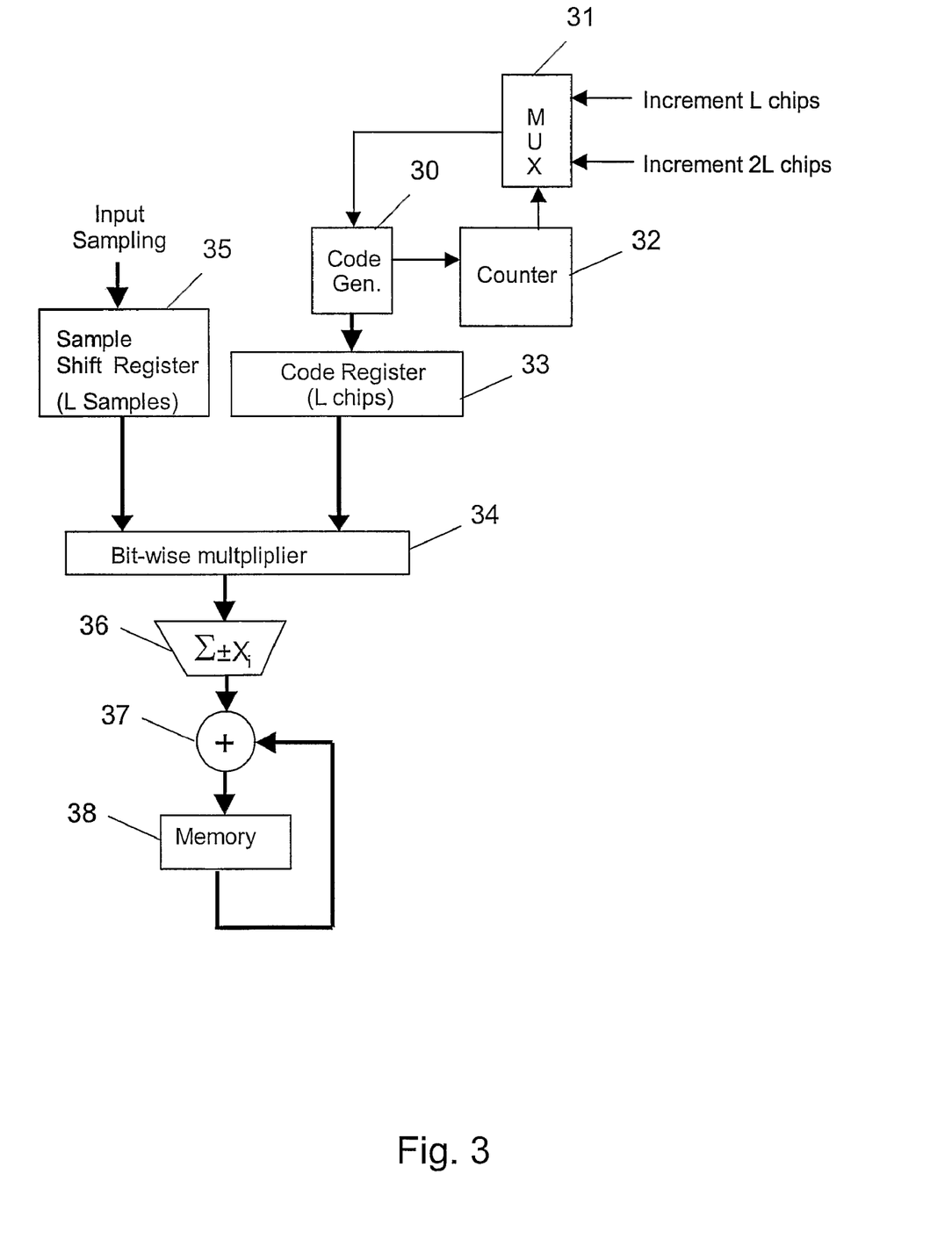
FIG. 3 is a block diagram of a correlator of the system of FIG. 2.

The correlator 23 is depicted in more detail in the block diagram of FIG. 3.

In the correlator 23, a code generator 30 receives control signals from a multiplexer 31. An output of the code generator 30 is fed back via a counter 32 to a control input of the multiplexer 31. The multiplexer 31 forwards one of two control signals to the code generator 30 in accordance with a signal at its control input. The first control signal represents a command 'Increment by L chips', while the second control signal represents a command 'Increment by 2L chips'.

An output of the code generator 30 is further connected via a code shift register 33, which is able to store L chips, to an input of a bit-wise multiplier 34.

In addition, a sample shift register 35, which is able to store L samples, is connected to an input of the bit-wise multiplier 34. The sample shift register 35 receives input samples from the receiving component 22 of the GPS module 21.

An output of the bit-wise multiplier 34 is connected via an integrator 36 and a combining component 37 to a memory 38. The memory 38 is coupled back to a second input of the combining component 37. The bit-wise multiplier 34, the integrator 36 and the combining component 37 form an adder tree.

Figure 4:
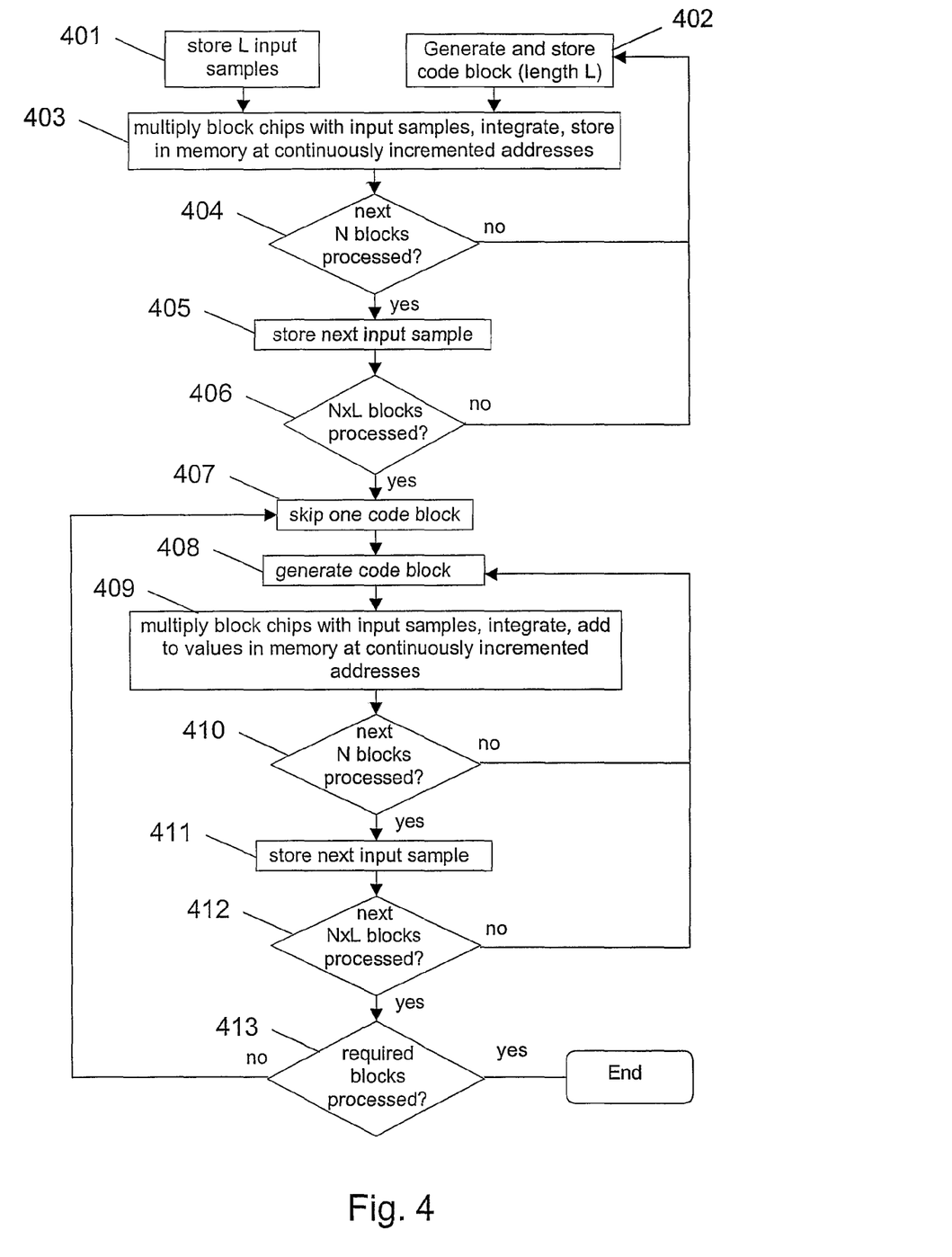
FIG. 4 is a flow chart illustrating the operation of the correlator of FIG. 3.
Figure 5:
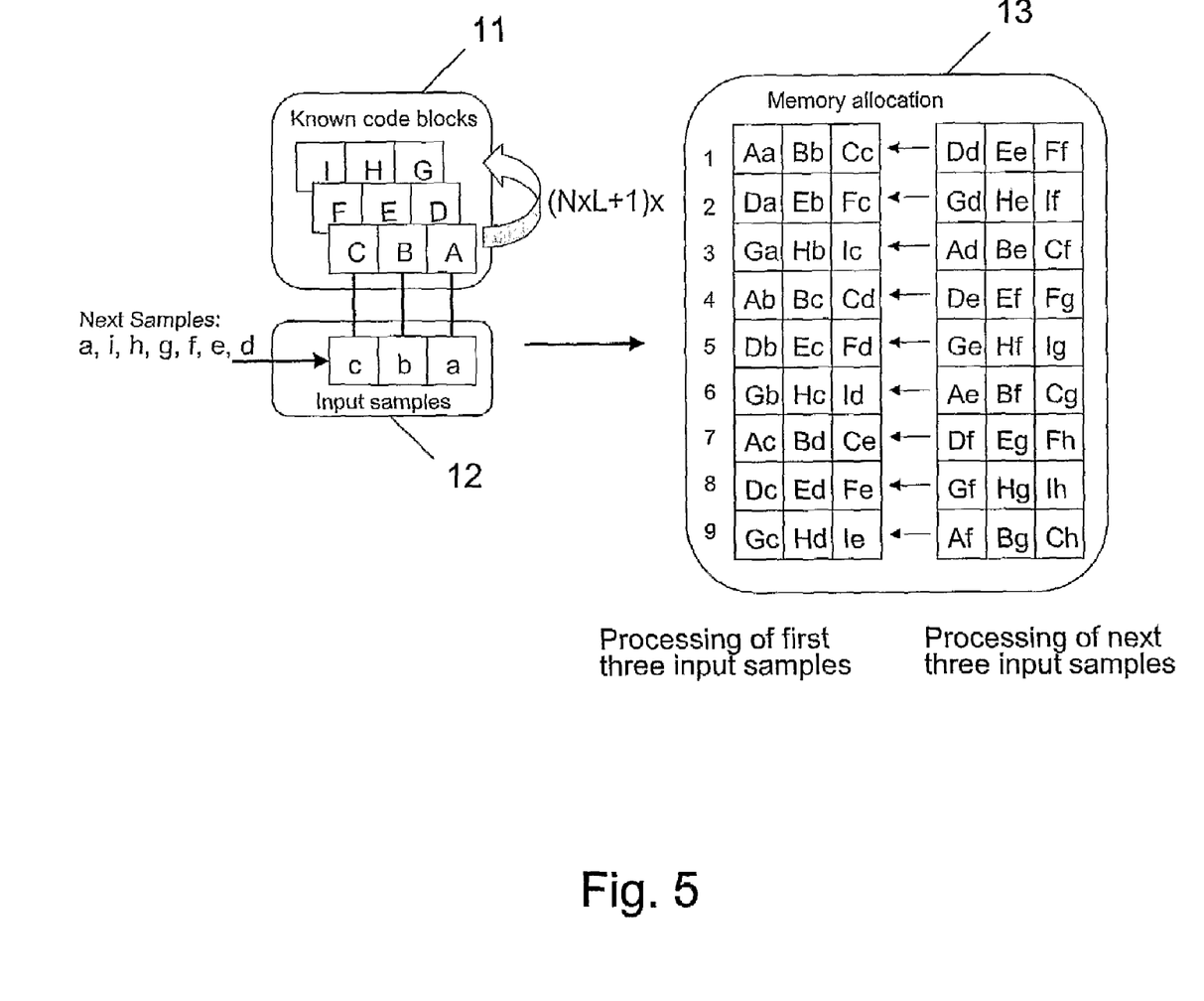
FIG. 5 is a diagram illustrating the principle of a memory allocation in the correlator of FIG. 3.

The operation of the correlator 23 will now be explained with reference to the flow chart of FIG. 4 and the diagram of FIG. 5. The diagram of FIG. 5 illustrates the principle of the operation by means of a simplified examples.

When the GPS module 21 receives a signal from a GPS satellite 29, the GPS module 21 has to determine the satellite from which the signal originates and the code phase the signal has. To this end, the receiving component 22 forwards samples of the received signal to the correlator 23 with a known sampling rate.

In the correlator 23, the first L samples are stored in the sample shift register 35 (step 401). In the schematic example presented in FIG. 5, L is equal to 3, and the first three samples stored in the sample shift register 35 are 'abc', which is indicated on the left hand side of section 12.

At the same time, the code generator 30 generates a first block of a C/A code (step 402). The C/A code is known to be used by a specific GPS satellite, possibly the satellite 29 from which the signal is received. The generated block comprises L subsequent chips of the code and is stored in the code register 33. In the schematic example presented in FIG. 5, the first L=3 samples stored in the code register 33 are 'ABC', which is indicated on the left-hand side of section 11.

Next, the multiplier 34 multiplies the samples from the sample shift register 35 and the chips in the code register 33 bit-wise. The integrator 36 integrates the multiplication results and the combining component 37 stores integration result as a partial correlation value at a first memory address in the memory 38. (step 403) As long as the memory 38 does not contain any partial correlation values at the involved memory address, the combining component 37 does not have any summing tasks. In the example of FIG. 5, the partial correlation value 'A*a+B*b+C*c' is stored at a memory address '1' in the memory 38, which is indicated on the left hand side of section 13.

Each time the code generator 30 outputs a block, it moreover provides a corresponding indication to the counter 32. Starting off with a counter value of zero, the counter 32 increments the counter value by one upon each receipt of a signal by the code generator 30 until a counter value of N×L is reached. Only when a counter value of N×L is reached, the counter 32 provides a control signal to the multiplexer 31.

As long as less than N blocks have been processed (step 404), the L samples in the sample shift register 34 remain the same. N blocks comprise all samples of the code exactly once. The code generator 30 generates at regular intervals the next block with L chips, since the multiplexer 31 provides a command 'Increment by L chips' to the code generator 30 (step 402), while no control signal is provided by the counter 32. A new block is generated by the code generator 30 with a frequency which is N times higher than the sampling frequency. The respective next block is correlated with the samples stored in the sample shift register 35 as described for the first block, and the resulting partial correlation value is stored in the memory at a memory address which are incremented by one for each new partial correlation value (step 403). In the example presented in FIG. 5, the second code block is 'DEF', and the second correlation result 'D*a+E*b+F*c' is stored at memory address '2'. The third code block is 'GHI', and the third correlation result 'G*a+H*b+I*c' is stored at memory address '3'.

After the input samples in the sample shift register 35 have been provided to the multiplier 34 for the Nth time for enabling a processing of the Nth block output by the code generator 30 (step 404), a further input sample is stored in the sample shift register 35 (step 405). This is achieved by ensuring that not only the code generator 30, but the entire correlator 23 runs at a frequency which is N times higher than the sampling frequency. In the example presented in FIG. 5, the three samples stored in the sample shift register 35 are now 'bcd'.

As long as the counter 32 does not reach the value 'N×L' (step 406), the code generator 30 continues generating a next block of the code, determining a respective partial correlation value, and storing the result in the memory 38 at a memory address incremented by one (steps 402, 403, 404). After respective N partial correlation values have been determined, or while the Nth partial correlation values is being determined, a new sample is input to the sample shift register 35 for the next N partial correlation values (steps 404, 405).

In the example of FIG. 5, the fourth block is again 'ABC', the fifth block 'DEF' and the sixth block 'GHI'. The fourth partial correlation value 'A*b+B*c+C*d' is stored at memory address '4', the fifth partial correlation value 'D*b+E*c+F*d' is stored at memory address '5', and the sixth partial correlation value 'G*b+H*c+I*d' is stored at memory address '6'. The three samples stored next in the sample shift register 35 are then 'cde', and the seventh block is again 'ABC', the eighth block 'DEF' and the ninth block 'GHI'. The seventh partial correlation value 'A*c+B*d+C*e' is stored at memory address '7', the eighth partial correlation value 'D*c+E*d+F*e' is stored at memory address '8', and the ninth partial correlation value 'G*c+H*d+I*e' is stored at memory address '9'.

Once the counter 32 reaches the value 'N×L' (step 406), all blocks for the first processing cycle have been provided by the code generator 30. The resulting partial correlation values are stored at N×L available memory addresses, each belonging to a different phase shift between the received samples and the known code. In the example of FIG. 5, correlation values are stored at 9 available memory addresses '1' to '9' after the first processing cycle.

For the next processing cycle, the counter 32 provides a control signal to the multiplexer 31, and the multiplexer 31 provides a command 'Increment by 2L chips' to the code generator 30. The counter value is reset thereupon to zero. As a result of the control signal from the multiplexer 31, the code generator 30 generates the next 2L chips, but outputs only the last L chips to the code register 33. That is, one block having a length of L chips is skipped in the output of the code generator 30. (steps 407, 408) In the example of FIG. 5, the ninth block 'GHI' is thus followed by a tenth block 'DEF' instead of a block 'ABC', as would be the case in a conventional block correlator. The samples in the sample shift register 35 have been updated automatically to 'def'.

Next, the multiplier 34 multiplies again the samples from the sample shift register 35 and the block in the code register 33 bit-wise. The integrator 36 integrates the multiplication results. The integration result, which forms another partial correlation value, is then added by the combining component 37 to the value stored at the first memory address in the memory 38. (step 409) In the example of FIG. 5, the partial correlation value 'D*d+E*e+F*f' is added to the value 'A*a+B*b+C*c' stored at the memory address '1' in the memory 38.

The process is repeated for the next N−1 blocks (steps 410, 408, 409). In the example of FIG. 5, the partial correlation value 'G*d+H*e+I*f' is added to the value 'D*a+E*b+F*c' stored at the memory address '2' in the memory 38. Thereafter, the partial correlation value 'A*d+B*e+C*f' is added to the value 'G*a+H*b+I*c' stored at the memory address '3' in the memory 38.

Thereafter, a new sample is input again to the sample shift register 35 (steps 410, 411). In the example of FIG. 5, this results in register value of the sample shift register 24 of 'efg'.

Partial correlation values are determined for this register value with continuously generated blocks, as before (steps 408, 409, 410). In the example of FIG. 5, the generated blocks are again blocks 'DEF', 'GHI' and 'ABC'. The partial correlation value 'D*e+E*f+F*g' is added to the value 'A*b+B*c+C*d' stored at the memory address '4' in the memory 38. The partial correlation value 'G*e+H*f+I*g' is added to the value 'D*b+E*c+F*d' stored at the memory address '5' in the memory 38. The partial correlation value 'A*e+B*f+C*g' is added to the value 'G*b+H*c+I*d' stored at the memory address '6' in the memory 38.

A respective further new sample is input to the sample shift register 35 after respective N new blocks have been generated, until the next N×L blocks have been processed (steps 411, 412). In the example of FIG. 5, the last input sample in this cycle results in a value 'fgh' of the sample shift register 35.

Partial correlations are performed with the respective values in the sample shift register 35 for continuously generated blocks (steps 408 to 412). Each determined partial correlation value is combined with the value stored at a respective next memory address. In the example of FIG. 5, the last blocks for the second processing cycle are again blocks 'DEF', 'GHI' and 'ABC'. The partial correlation value 'D*f+E*g+F*h' is added to the value 'A*c+B*d+C*e' stored at the memory address '7' in the memory 38. The partial correlation value 'G*f+H*g+I*h' is added to the value 'D*c+E*d+F*e' stored at the memory address '8' in the memory 38. The partial correlation value 'A*f+B*g+C*h' is added to the value 'G*c+H*d+I*e' stored at the memory address '9' in the memory 38.

Steps 407 to 412 are continued, until all N×L×N processing cycles have been completed. At the beginning of each processing cycle, one block is skipped (step 407) when the next block is generated (step 408).

In the example of FIG. 5, the final value in the memory 38 at the memory address '1', for instance, is thus 'A*a+B*b+C*c+D*d+E*e+F*f+G*g+H*h+I*i'. This value is the correlation value for a phase shift of zero between the received signal and the known C/A code. At the other eight memory addresses '2' to '9', the final correlation values for the possible eight other phase shifts are stored.

Due to the shift by one block at the beginning of each processing cycle, the required memory addresses can thus be obtained throughout the correlation process by simply round rotating the available memory addresses, which can be realized by a simple and small address pointer. A jumping between memory addresses and thus a complex state machine required in conventional block correlators can be avoided.

While the embodiment has been described for reasons of better comprehensibility for codes which are divided into 3 blocks of 3 samples each, it is to be understood that there are no limits to the amount of blocks or the amount of samples per block.

The further use of the final correlation values is well known in the art. The final correlation values can be provided for instance by the memory 38 to the evaluation component 24, where the final correlation values are evaluated for determining whether the considered C/A code is the correct C/A code for the received signal and what is the correct phase shift. The obtained information may then be used in further processing steps required for the functions offered by the GPS module 21, for example decoding the received signal, extracting navigation information, and determining the current position of the mobile device 20 based on navigation information and measurement results. The GPS module 21 may provide for instance positioning information to an application running in the mobile device 20.

While there have been shown and described and pointed out fundamental novel features of the invention as applied to an embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for processing a data word in a plurality of processing cycles by an apparatus, said method comprising:
   dividing said data word for each processing cycle into a plurality of successive data blocks, wherein said successive data blocks are shifted by one data block from one processing cycle to the next;
   in each of said processing cycles, processing each of said successive data blocks in sequence;
   in a first processing cycle, storing processing results for said successive data blocks of said first processing cycle in a memory at memory addresses which change uniformly from one processing result to the next; and
   in each subsequent processing cycle, combining the processing results for said successive data blocks of said subsequent processing cycle with processing results stored in said memory during a preceding processing cycle at memory addresses which change uniformly from one processing result in said subsequent processing cycle to the next.

2. The method according to claim 1, wherein for storing and combining said processing results, said memory is addressed with an address pointer which is incremented for each memory access in a round rotating manner.

3. The method according to claim 1, wherein for shifting said successive data blocks by a respective data block from one processing cycle to the next, successive data blocks of said data word are generated cyclically and continuously, except that one data block is skipped at the beginning of a respective subsequent processing cycle.

4. The method according to claim 1, wherein said processing of successive data blocks comprises correlating said known data word block-wise with provided samples.

5. The method according to claim 4, wherein said data word is a known code and wherein said provided samples are samples of a code modulated signal.

6. An apparatus for processing a data word in a plurality of processing cycles, said apparatus comprising:
   a data word dividing component configured to divide said data word for each processing cycle into a plurality of successive data blocks, wherein said successive data blocks are shifted by one data block from one processing cycle to the next;
   a processing component configured to process each of said successive data blocks in sequence in each of said processing cycles;
   a memory; and
   a combining component configured to store processing results for successive data blocks of a first processing cycle in said memory at memory addresses which change uniformly from one processing result to the next, and configured to combine in each subsequent processing cycle the processing results for said successive data blocks of said subsequent processing cycle with processing results stored in said memory during a preceding processing cycle at memory addresses which change uniformly from one processing result in said subsequent processing cycle to the next.

7. The apparatus according to claim 6, wherein said combining component for storing and combining said processing results comprises an address pointer which is incremented for each memory access in a round rotating manner.

8. The apparatus according to claim 6, wherein for shifting said successive data blocks by a respective data block from one processing cycle to the next, said data word dividing component is configured to generate successive data blocks of said data word cyclically and continuously, except that one data block is skipped at the beginning of a respective subsequent processing cycle.

9. The apparatus according to claim 6, wherein said data word dividing component comprises a data word generator, a multiplexer and a counter,
    said data word generator generating blocks of said data word in a cyclic manner;
    said counter counting the number of generated blocks and providing a predetermined control signal to said multiplexer whenever a number of blocks required for one processing cycle has been generated; and
    said multiplexer causing said data word generator to generate successive blocks of said data word as long as said counter does not provide said predetermined control signal, and causing said data word generator to skip one block of said data word whenever said counter provides said predetermined control signal.

10. The apparatus according to claim 6, wherein said processing component is configured to process successive data blocks by correlating said data word block-wise with provided samples.

11. The apparatus according to claim 10, wherein said data word is a known code and wherein said provided samples are samples of a code modulated signal.

12. The apparatus according to claim 6, wherein said apparatus is realized in hardware.

13. The apparatus according to claim 6, wherein said apparatus is one of a mobile phone, a code division multiple access capable receiver and a satellite signal receiver.

14. A system comprising a processing module for processing a data word in a plurality of processing cycles and at least one other module configured to exchange data with said processing module at least uni-directionally, said processing module including:
    a data word dividing component configured to divide said data word for each processing cycle into a plurality of successive data blocks, wherein said successive data blocks are shifted by one data block from one processing cycle to the next;
    a processing component configured to process each of said successive data blocks in sequence in each of said processing cycles;
    a memory; and
    a combining component configured to store processing results for successive data blocks of a first processing cycle in said memory at memory addresses which change uniformly from one processing result to the next, and configured to combine in each subsequent processing cycle the processing results for said successive data blocks of said subsequent processing cycle with processing results stored in said memory during a preceding processing cycle at memory addresses which change uniformly from one processing result in said subsequent processing cycle to the next.

15. A software program product comprising a computer readable medium in which a software code for processing a data word in a plurality of processing cycles is stored, said software code realizing the following when running in a processing component:
    dividing said data word for each processing cycle into a plurality of successive data blocks, wherein said successive data blocks are shifted by one data block from one processing cycle to the next;
    in each of said processing cycles, processing each of said successive data blocks in sequence;
    in a first processing cycle, storing processing results for said successive data blocks of said first processing cycle in a memory at memory addresses which change uniformly from one processing result to the next; and
    in each subsequent processing cycle, combining the processing results for said successive data blocks of said subsequent processing cycle with processing results stored in said memory during a preceding processing cycle at memory addresses which change uniformly from one processing result in said subsequent processing cycle to the next.

16. The software program product according to claim 15, wherein for storing and combining said processing results, said memory is addressed with an address pointer which is incremented for each memory access in a round rotating manner.

17. The software program product according to claim 15, wherein for shifting said successive data blocks by a respective data block from one processing cycle to the next, successive data blocks of said data word are generated cyclically and continuously, except that one data block is skipped at the beginning of a respective subsequent processing cycle.

18. The software program product according to claim 15, wherein said processing of successive data blocks comprises correlating said known data word block-wise with provided samples.

19. The apparatus according to claim 6, wherein said apparatus is a processing module for an electronic device.

20. An apparatus for processing a data word in a plurality of processing cycles, said apparatus comprising:
    means for dividing said data word for each processing cycle into a plurality of successive data blocks, wherein said successive data blocks are shifted by one data block from one processing cycle to the next;
    means for processing each of said successive data blocks in sequence in each of said processing cycles; and
    means for storing processing results for successive data blocks of a first processing cycle in a memory at memory addresses which change uniformly from one processing result to the next, and for combining in each subsequent processing cycle the processing results for said successive data blocks of said subsequent processing cycle with processing results stored in said memory during a preceding processing cycle at memory addresses which change uniformly from one processing result in said subsequent processing cycle to the next.

* * * * *